United States Patent
Kim et al.

(10) Patent No.: US 8,025,998 B2
(45) Date of Patent: Sep. 27, 2011

(54) POUCH TYPE SECONDARY BATTERY AND FABRICATION METHOD THEREOF

(75) Inventors: Junghak Kim, Yongin-si (KR); Seongjoon Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 764 days.

(21) Appl. No.: 12/076,853

(22) Filed: Mar. 24, 2008

(65) Prior Publication Data

US 2008/0268344 A1 Oct. 30, 2008

(30) Foreign Application Priority Data

Apr. 27, 2007 (KR) .................. 10-2007-0041272

(51) Int. Cl.
*H01M 2/06* (2006.01)
*H01M 2/08* (2006.01)

(52) U.S. Cl. ............ 429/180; 429/7; 429/181; 29/623.2

(58) Field of Classification Search .............. 429/7, 180, 429/181, 184; 29/623.2
See application file for complete search history.

(56) References Cited

U.S. PATENT DOCUMENTS

| | | | |
|---|---|---|---|
| 6,797,429 B1 * | 9/2004 | Komatsu | 429/181 X |
| 6,803,144 B2 * | 10/2004 | Hovi et al. | 429/7 X |
| 6,893,753 B2 * | 5/2005 | Iwaizono et al. | 429/7 |
| 7,166,387 B2 | 1/2007 | Oogami | |
| 7,201,998 B2 * | 4/2007 | Kim | 429/180 |
| 7,427,453 B2 * | 9/2008 | Kim | 429/170 |
| 7,718,306 B2 | 5/2010 | Cheon et al. | |
| 2006/0238162 A1 * | 10/2006 | Cheon et al. | 320/112 |
| 2007/0292753 A1 | 12/2007 | Zama et al. | |

FOREIGN PATENT DOCUMENTS

| | | |
|---|---|---|
| CN | 1925189 A | 3/2007 |
| EP | 0570590 A1 | 11/1993 |
| EP | 1096589 A1 | 5/2001 |
| EP | 1868257 A1 | 12/2007 |
| JP | 2001-256960 | 9/2001 |
| JP | 200487300 A | 3/2004 |
| KR | 10-2003-0040812 | 5/2003 |
| KR | 1020040084116 | 10/2004 |
| KR | 1020060034511 A | 4/2006 |
| KR | 100684724 B1 | 10/2006 |

* cited by examiner

*Primary Examiner* — Stephen J. Kalafut
(74) *Attorney, Agent, or Firm* — Robert E. Bushnell, Esq.

(57) ABSTRACT

A pouch type secondary battery, in which a bent state of a cathode tap and an anode tap is maintained by eliminating a restoration phenomenon caused by an elastic force of the insulating tape when the cathode tap and the anode tap are bent by forming bending grooves on cathode and anode insulating tapes, includes: an electrode assembly which includes a cathode electrode plate where a cathode tap is connected, a anode electrode plate where an anode tap is connected, and a separator interposed between the cathode electrode plate and the anode electrode plate; a pouch containing the electrode assembly therein such that the cathode tap and the anode tap are exposed to the outside; a cathode insulation tape forming a first bending groove on at least one side portion and wrapped around the cathode tap so as to insulate a region where the cathode tap is in contact with the pouch; and an anode insulation tape forming a second bending groove on at least one side portion and wrapped around the anode tap so as to insulate a region where the anode tap is in contact with the pouch.

16 Claims, 8 Drawing Sheets

POUCH TYPE SECONDARY BATTERY AND FABRICATION METHOD THEREOF

CLAIM OF PRIORITY

This application makes reference to, incorporates the same herein, and claims all benefits accruing under 35 U.S.C. §119 from an application for POUCH TYPE SECONDARY BATTERY AND FABRICATION METHOD THEREOF earlier filed in the Korean Intellectual Property Office on the 27 Apr. 2007 and there duly assigned Serial No. 2007-0041272.

BACKGROUND OF THE INVENTION

1. Field of the Invention

The present invention relates to a secondary battery, and more particularly, to a pouch type secondary battery.

2. Description of the Related Art

With the proliferation of portable electronic devices, such as video cameras, cellular phones, portable computers, etc., secondary batteries have been used as their driving power supplies. Especially, lithium secondary batteries can be rechargeable rapidly and has higher energy density per unit weight than conventional lead batteries, nickel-cadmium batteries, nickel-hydrogen batteries, and nickel-zinc batteries. Accordingly, lithium secondary batteries are being actively used.

A lithium secondary battery uses lithium group oxides as cathode active materials, and a carbon material as an anode active material. An electrode assembly is fabricated by laminating a cathode plate where a cathode tap is connected to a cathode collector formed of the cathode active material, an anode plate where an anode tap is connected to an anode collector formed of the anode active material, and a separator interposed between the cathode plate and the anode plate, are laminated and wound together. The electrode assembly is contained within a metal can of an angle type or a cylinder type or in a pouch.

A lithium secondary battery can be divided into a lithium ion battery using a liquid electrolyte, and a lithium ion polymer battery using a polymer solid electrolyte, depending on the kind of electrolyte. A lithium ion polymer battery can be divided into a solid type lithium ion polymer battery containing no electrolyte, and a gel type lithium ion polymer battery using a gel type polymer electrolyte.

A lithium secondary battery using the liquid electrolyte is usually contained within a metal can of a cylinder or an angle type which is sealed by welding.

Since a can type secondary battery using a metal can has a fixed shape, the design of electronic products is limited, and reducing a volume of electronic products is difficult. Accordingly, the pouch type secondary battery has been developed by putting two electrodes, a separator and an electrolyte in a pouch made of a film and sealing the pouch.

The pouch conventionally used for the lithium ion polymer battery includes a multilayer structure laminated by a polyolefin group resin layer that is an inner heat adherent layer having a heat adhesion property as a sealing material, an intermediate aluminum layer (AL) functioning as a base material to maintain mechanical strength and a barrier layer with respect to moisture and oxygen, and an outer nylon layer functioning as a base material and a protection layer.

In a method of fabrication of a pouch type secondary battery, the pouch is first divided into a lower part receiving the electrode assembly in a receiving part of the pouch, and an upper part covering an opening of the lower part. The cathode tap is coupled to the cathode plate so as to protrude outside of the pouch. The anode tap is also coupled to the cathode plate so as to protrude outside of the pouch. An insulating tape is wrapped on a region where the cathode tap is in contact with the pouch, so as to insulate the pouch and the cathode tap. The insulating tape is also wrapped on a region where the anode tap is in contact with the pouch, so as to insulate the pouch and the anode tap. The cathode tap and the anode tap are coupled to a protection circuit substrate by bending an end portion of both the cathode tap and the anode tap.

There is a problem in that the cathode tap and the anode tap are not bent to a desirable angle because a restoration phenomenon after bending the cathode tap and the anode tap is produced by an elastic force of the insulating tape occurring in bending the end portion of both the cathode tap and the anode tap. In addition, there is a problem in that an assembly error occurs when the protection circuit substrate is coupled because the bent region is not uniform when the cathode tap and the anode tap are bent.

SUMMARY OF THE INVENTION

An object of the present invention is to provide a pouch type secondary battery including a cathode tap and an anode tap that are bent so as to eliminate a restoration phenomenon caused by an elastic force of an insulating tape occurring when both the cathode tap and the anode tap are bent.

Another object of the present invention is to provide a pouch type secondary battery including a cathode tap and an anode tap that can be bent at a same position.

Additional advantages, objects and features of the present invention are set forth in part in the description which follows and in part will become apparent to those having ordinary skill in the art upon examination of the following or may be learned from the practice of the present invention.

According to one aspect of the present invention, a pouch type secondary battery is provided including: an electrode assembly which includes a cathode electrode plate where a cathode tap is connected, a anode electrode plate where an anode tap is connected, and a separator interposed between the cathode electrode plate and the anode electrode plate; a pouch receiving the electrode assembly such that the cathode tap and the anode tap are exposed to the outside; a cathode insulation tape forming a first bending groove on at least one side portion and wrapped around the cathode tap so as to insulate a region where the cathode tap is in contact with the pouch; and an anode insulation tape forming a second bending groove on at least one side portion and wrapped around the anode tap so as to insulate a region where the anode tap is in contact with the pouch.

The cathode tap and the anode tap extend from the pouch so as to be parallel to each other in same direction.

The cathode and anode insulating tapes are formed of either polypropylene or polyethylene.

The first and second bending grooves are formed on the same line.

The first bending groove is symmetrically formed on both side portions of the cathode insulating tape, and the second bending groove is symmetrically formed on both side portions of the anode insulating tape.

The first and second bending grooves are formed to have the same depth.

The first and second bending grooves are formed to have different depths.

The first and second bending grooves are formed by a 'V' shaped notch.

The first and second bending grooves formed by the 'V' shaped notch are formed in direction such that one edge neighboring two edges of the pouch is orthogonal to a longitudinal direction of the cathode tap and the anode tap.

The first and second bending grooves are alternatively formed by a 'U' shaped notch.

The cathode tap is formed to be bent at the first bending groove, and the anode tap is formed to be bent at the second bending groove.

One end portion of both the cathode tap and the anode tap is electrically coupled to a protection circuit substrate where a charge/discharge terminal is formed. Both the cathode tap and the anode tap are formed by being bent more than once, so that a wide surface of the protection circuit substrate including the charge/discharge terminal is parallel to a wide surface of the pouch.

One end portion of both the cathode tap and the anode tap are electrically coupled to the protection circuit substrate, where the charge/discharge terminal is formed, and the cathode tap and the anode tap are formed so that a wide surface of the protection circuit substrate including the charge/discharge terminal is orthogonal to a wide surface of the pouch.

According to another aspect of the present invention, a method of fabrication of a pouch type secondary battery is provided, the method including: preparing the pouch type secondary battery receiving an electrode assembly and exposing a cathode tap and an anode tap insulated by respective cathode and anode insulating tapes; forming a notch on both side portions of both the cathode and anode insulating tapes; attaching a rectangular jig on a straight line connecting vertexes of the notches; and bending both the cathode tap and the anode tap at the vertexes of the notches.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
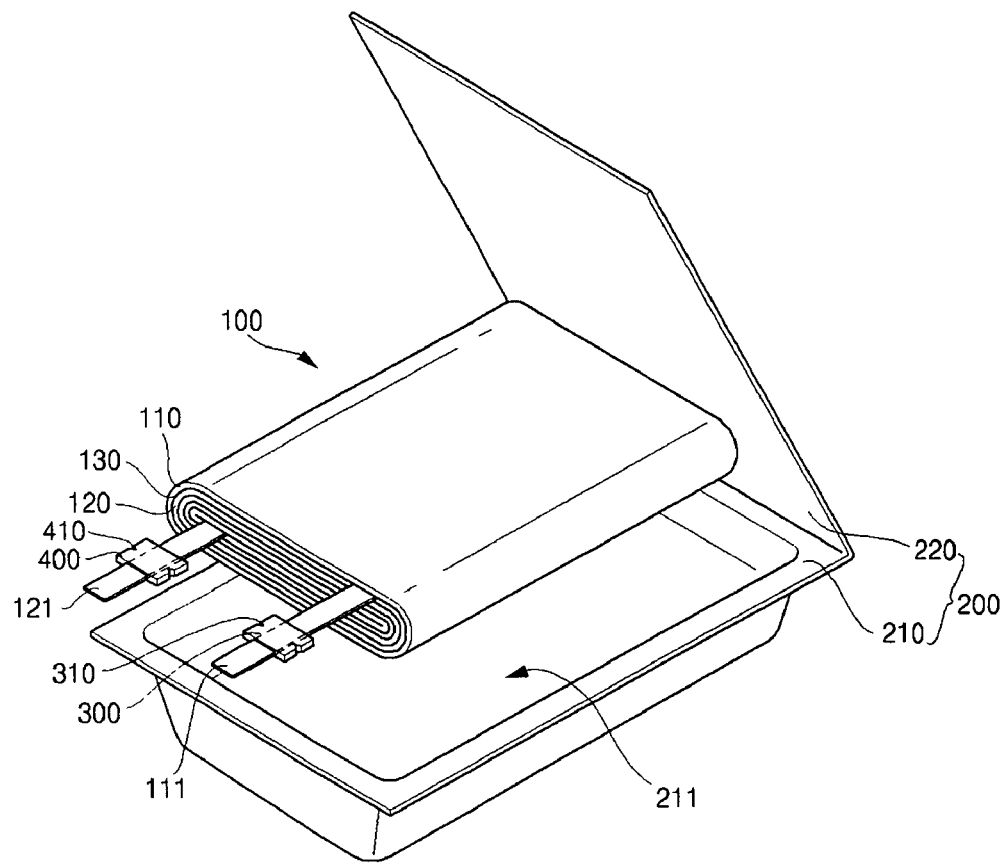
FIG. 1 is an exploded perspective view of a pouch type secondary battery according to one exemplary embodiment of the present invention.

Hereinafter, exemplary embodiments of the present invention are described in detail with reference to the accompanying drawings. The aspects and features of the present invention and methods for achieving the aspects and features will be apparent by referring to the embodiments described in detail below with reference to the accompanying drawings. However, the present invention is not limited to the embodiments disclosed hereinafter, but can be implemented in diverse forms. The matters defined in the description, such as the detailed structure and elements, are merely specific details provided to assist those of ordinary skill in the art in a comprehensive understanding of the present invention, and the present invention is only defined within the scope of the appended claims. In the entire description of the present invention, the same drawing reference numerals are used for the same elements across various figures.

Referring to FIG. 1, a pouch type secondary battery includes an electrode assembly 100, a pouch 200, a cathode insulating tape 300, and an anode insulating tape 400.

The electrode assembly 100 is formed by laminating and winding a cathode plate 110 where a cathode tap 111 is coupled, an anode plate 120 where an anode tap 121 is coupled, and a separator 130.

The electrode assembly 100 includes a cathode electrode plate 110 where a cathode tap 111 is connected, a anode electrode plate 120 where an anode tap 121 is connected, and a separator 130 interposed between the cathode electrode plate 110 and the anode electrode plate 120.

The cathode plate 110 may include a cathode collector and a cathode active material. The cathode active material includes a layer-shaped compound containing lithium, a binder improving combined force, and a conductive material improving conductivity. The cathode collector is usually made of aluminum, functions as a transfer passage of charges generated from the cathode active material layer, and supports the layer of the cathode active material. The cathode active material layer is attached on wide surfaces of the cathode collector. An uncoated cathode portion (not shown), having no cathode active material layer formed thereon, is formed on one side end of the cathode plate 110. The cathode tap 111 is adhered to the uncoated cathode portion.

The anode plate 120 includes an anode collector and an anode active material layer. The anode active material layer generally includes hard carbon or graphite, and a binder improving combined force of active material particles. The anode collector is usually made of copper, functions as a transfer passage of charges generated by the anode active material layer, and supports the anode active material layer. An uncoated anode portion (not shown), having no anode active material layer formed thereon, is formed on one side end of the anode plate 120. The anode tap 121 is adhered to the cathode uncoated part.

The separator 130 is interposed between the cathode plate 110 and the anode plate 120 so as to insulate the cathode plate 110 and the anode plate 120, and passes through charges of the cathode plate 110 and the anode plate 120. The separator 130 is generally made of polyethylene (PE) or polypropylene (PP). However, the present invention is not limited thereto. The separator 130 includes electrolyte which may be in a liquid phase or may be a gel type.

The cathode tap 111 and the anode tap 121 may be formed of aluminum or an alloy containing aluminum or nickel, or an alloy containing nickel. However, the present invention is not limited thereto.

The pouch 200 receives the electrode assembly 100, and exposes the cathode tap 111 and the anode tap 121 to the outside. The pouch 200 may include a multilayer film where several layers are laminated. An inner layer of the multilayer film, i.e., a heat adherent layer may be formed of CPP (Cast Polypropylene), and an intermediate barrier layer may be formed of an aluminum layer, and an outer protection film may be formed of a nylon layer. The pouch 200 may include a lower film 210 where a receiving groove 211 to receive the electrode assembly 100 is formed, and an upper film 220 finishing an opening of the lower film 210. The lower film 210 and the upper film 220 may be attached by applying heat to the adherent layer where the lower film 210 and the upper film 220 are in contact with. Cathode and anode insulating tapes 300 and 400 interposed between the lower film 210 and the upper film 220 may be adhered to the pouch 200 by heat. However, the present invention is not limited thereto.

Figure 2:
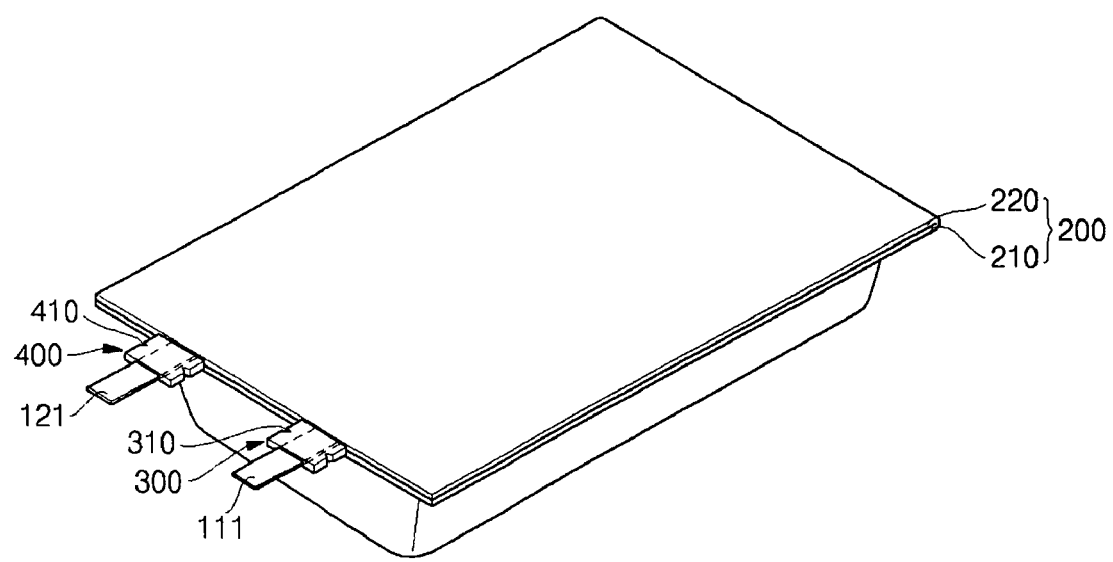
FIG. 2 is a perspective view of a combined pouch type secondary battery according to one exemplary embodiment of the present invention.

Referring to FIG. 2, the cathode insulating tape 300 wraps the exposed cathode tap 111 so as to insulate a region contacting the pouch 200, and a first bending groove 310 may be formed on a side part of the cathode insulating tape 300.

The anode insulating tape 400 wraps the exposed anode tap 121 so as to insulate a region contacting the pouch 200, and a second bending groove 410 may be formed on a side part of the anode insulating tape 400.

The first and second bending grooves 310 and 410 formed on the cathode and anode insulating tapes 300 and 400 indicate a point where the cathode tap 111 and the anode tap 121 are bent, thereby improving yield when products are fabricated. If the first and second bending grooves 310 and 410 are formed on the cathode and anode insulating tapes 300 and 400, elasticity of the cathode and anode insulating tapes 300 and 400 is reduced near the first and second bending grooves 310 and 410. The cathode tap 111 and the anode tap 121 may be easily bent if they are bent at the first and second bending grooves 310 and 410.

The cathode tap 111 and the anode tap 121 may be exposed together on the pouch 200 in same direction. The cathode tap 111 and the anode tap 121 exposed together may be bent at the first and second bending grooves 310 and 410 at the same time, so that a bending process of the cathode tap 111 and the anode tap 121 may be completed once.

The cathode and anode insulating tapes 300 and 400 may be formed of either polypropylene or polyethylene. The cathode tap 111 and the anode tap 121 are difficult to bend because the cathode and anode insulating tapes 300 and 400 have strong elasticity, when the cathode tap 111 and the anode tap 121 are bent. However, polypropylene and polyethylene are thermoplastic resins, and they adhere well to the pouch 200 so that the pouch 200 is well sealed, and has good insulating property and thermal resistance after the polypropylene or the polyethylene is adhered. The cathode tap 111 and the anode tap 121 may be easily bent by forming the first and second bending grooves 310 and 410 on the cathode and anode insulating tapes 300 and 400 as well as using the advantages of polypropylene or polyethylene.

Figure 3:
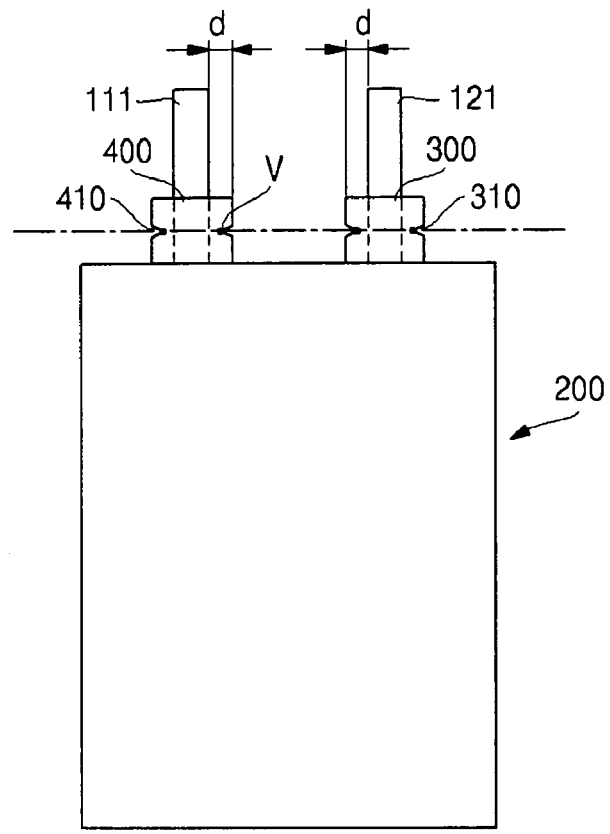
FIG. 3 is a plane view of the pouch type secondary battery according to one exemplary embodiment of the present invention.

Referring to FIG. 3, the first and second bending grooves 310 and 410 may be formed on the same line. If the cathode tap 111 and the anode tap 121 are bent at the first and second bending grooves 310 and 410 formed on the same line, only one bending process may be needed, thereby simplifying the process. An outer dimension of the pouch type secondary battery may be simplified by forming length from a position, where the cathode tap 111 and the anode tap 121 are exposed on the pouch 200, to a bent region so as to have the same dimension.

The first bending groove 310 may be symmetrically formed on both side parts of the cathode insulating tape 300, and the second bending groove 410 may be symmetrically formed on both side parts of the anode insulating tape 400. When the cathode tap 111 and the anode tap 121 are bent at the first and second bending grooves 310 and 410, the cathode tap 111 and the anode tap 121 may be bent without being twisted to the left or right.

When material and a size of the cathode tap 111 and the anode tap 121 are same, the depth (d) of the first and second bending grooves 310 and 410 may be formed so as to be the same. When the material and the size of the cathode tap 111 and the anode tap 121 are same, and the cathode tap 111 and the anode tap 121 are bent at the first and second bending grooves 310 and 410, the first and second bending grooves 310 and 410 formed on the bent region may be formed so as to have the same depth (d) and bent because the elasticity of the cathode tap 111 and the anode tap 121 is also same.

The depth (d) of the first and second bending grooves 310 and 410 may be formed so as to be different from each other. When the material and the size of the cathode tap 111 and the anode tap 121 are different from each other so as to have different elasticity, the cathode tap 111 and the anode tap 121 may be easily bent by making the depth of the first and second bending grooves 310 and 410 different from each other. This is to prevent that a bent angle of the cathode tap 111 and the anode tap 121 is differently formed due to the elasticity of the cathode and anode insulating tapes caused by bending the cathode tap 111 and the anode tap 121. Accordingly, the bent angle of the cathode tap 111 and the anode tap 121 may be adjusted by forming the depth (d) of the first and second bending grooves 310 and 410 so as to be different from each other. Even when thickness or width of the cathode tap 111 and the anode tap 121 is different, the bent angle of the cathode tap 111 and the anode tap 121 maybe adjusted by forming the depth (d) of the first and second bending grooves 310 and 410 so as to be different from each other.

The first bending grooves 310 may be formed by a 'V' shaped notch, and the second bending grooves 410 may be also formed by a 'V' shaped notch. If the first and second bending grooves 310 and 410 are formed by 'V' shaped notches, the first and second bending grooves 310 and 410 have vertexes (v). Accordingly, if the cathode tap 111 and the anode tap 121 are bent together at the vertexes(v) after placing the vertexes(v) on a same line, the bending process becomes very easy.

Figure 4:
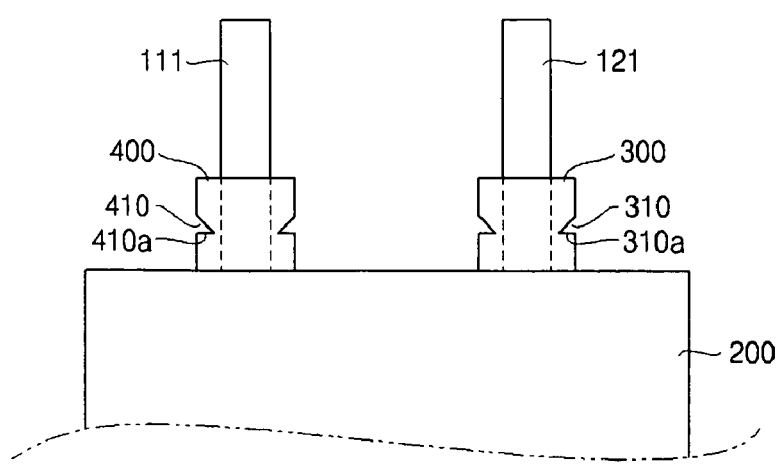
FIG. 4 is a partial plane view of the pouch type secondary battery according to one exemplary embodiment of the present invention.

Referring to FIG. 4, one edge neighboring the pouch 200 of two edges of the first bending groove 310 formed by the 'V' shaped notch 310a may be formed to be orthogonal to a longitudinal direction of the cathode tap 111. One edge neighboring the pouch 200 of two edges of the second bending groove 410 formed by the 'V' shaped notch 410a may be formed to be orthogonal to a longitudinal direction of the cathode tap 111. In other words, one edge of a region neighboring to the pouch 200 is formed to be orthogonal to a longitudinal direction of the cathode tap 111. Then, after a jig (not shown), where a protruded ridge of a straight line type is formed on a orthogonal region, is coincided on the edges of the 'V' shape neighboring to the pouch 200, the cathode tap 111 and the anode tap 121 are bent. The cathode tap 111 and the anode tap 121 have a structure that is bent very easily by using the jig.

Figure 5:
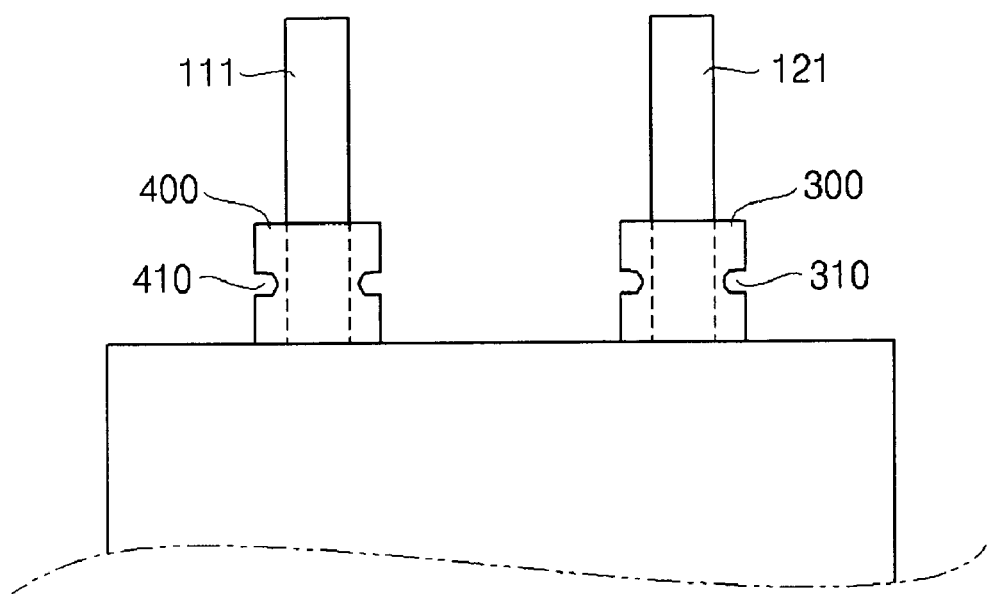
FIG. 5 is a partial plane view of the pouch type secondary battery according to one exemplary embodiment of the present invention.

Referring to FIG. 5, the first bending grooves 310 maybe formed by a 'U' shaped notch, and the second bending grooves 410 may be also formed by a 'U' shaped notch. When the 'U' shape including a round corner part is bent, a margin of assembly error may be relatively more than the 'V' shape because there is more error margin on the round corner part. Accordingly, when the cathode tap 111 and the anode tap 121 combined with other components (not shown) do not come to a right position, the cathode tap 111 and the anode tap 121 are more folded or unfolded within a bending range of the round corner so as to correspond to the generation of the assembly error. The round corner may be formed to be a straight line type.

Figure 6:
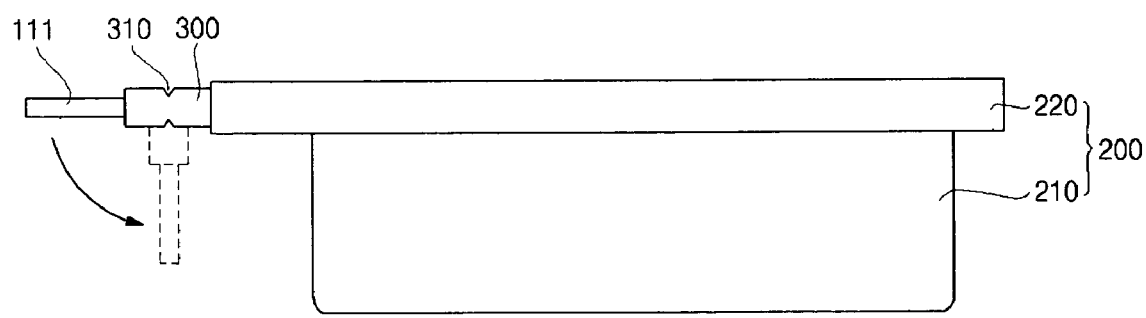
FIG. 6 is a side view of the pouch type secondary battery according to one exemplary embodiment of the present invention.

Referring to FIG. 6, the cathode tap 111 may be bent at the first bending groove 310, and the anode tap (not shown) may be bent at the second bending groove (not shown). If the cathode tap 111 and the anode tap (not shown) are bent to various angles, other components may be easily coupled to the cathode tap 111 and the anode tap (not shown).

Figure 7:
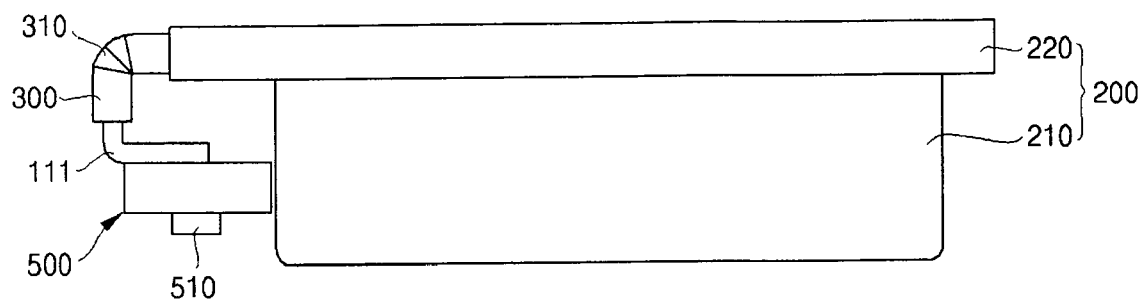
FIG. 7 is a side view of the pouch type secondary battery combined with a protection circuit substrate according to one exemplary embodiment of the present invention.

Referring to FIG. 7, one end part of the cathode tap 111 and the anode tap (not shown) maybe electrically coupled to a protection circuit substrate 500 where a charge/discharge terminal 510 is formed. The protection circuit substrate 500 includes a charge/discharge terminal 510 and a protection circuit (not shown). The charge/discharge terminal 510 is electrically coupled to a printed circuit pattern, and a Field Effect Transistor (FET) or a transistor, i.e., an active element that functions as a switch for charge/discharge. The charge/discharge terminal 510 provides an electrical passage, where a secondary battery maybe charged or discharged by a protection circuit having a function of charge/discharge management. The protection circuit unit may be include a passive element, an active element and a protection circuit, soldered to the printed circuit pattern formed on an upper surface of an insulation substrate. The protection circuit may be electrically coupled to the passive element and the active element so as to manage all states of the secondary battery, check a remaining capacity of the secondary battery, charge by selecting a desired charge method depending on charge/discharge state of the secondary battery, and control discharge. The protection circuit memorizes information on a voltage, an electric current, temperature, and a remaining capacity of the battery so as to send the information via communication with outer devices. The protection circuit may be formed by integrated circuits, where a plurality of logic elements and active/passive elements are integrated.

An inspecting terminal (not shown) may be further formed on a wide surface where the charge/discharge terminal 510 of the protection circuit substrate 500 is formed. The inspecting terminal may be electrically coupled to the printed circuit pattern so as to provide the electrical passage that can check if a charge/discharge function of the protection circuit or the protection circuit is operating normally.

The protection circuit substrate 500 may be electrically coupled to the cathode tap 111 and the anode tap (not shown). The cathode tap 111 and the anode tap (not shown) may be bent at the first bending groove 310 and the second bending groove (not shown), and then bent once more. Accordingly, the wide surface of the protection circuit substrate 500 may be formed to be parallel to a wide surface of the pouch 200. If the pouch type secondary battery formed by the structure is received on a coupling part of the battery of portable electronic devices (not shown), the charge/discharge terminal 510 may be coupled to the coupling part of the battery of portable electronic devices while the charge/discharge terminal 510 is orthogonal to the wide surface of the pouch 200.

Figure 8:
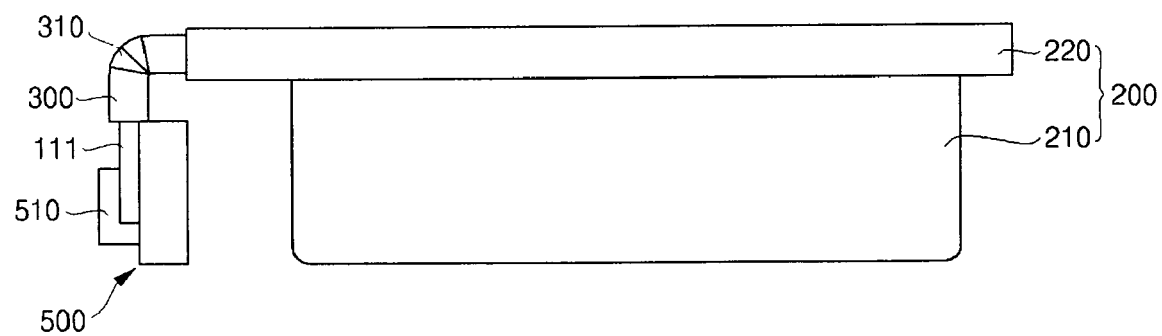
FIG. 8 is a side view of the pouch type secondary battery combined with the protection circuit substrate according to one exemplary embodiment of the present invention.

Referring to FIG. 8, one end part of the cathode tap 111 and the anode tap (not shown) may be coupled to the protection circuit substrate 500 where the charge/discharge terminal 510 is formed. Accordingly, the wide surface of the protection circuit substrate 500, where the charge/discharge terminal 510 is formed, may be formed to be orthogonal to the wide surface of the pouch 200. The cathode tap 111 and the anode tap (not shown) may be bent at the first bending groove 310 and the second bending groove (not shown), so that the wide surface of the protection circuit substrate 500 may be formed to be orthogonal to the wide surface of the pouch 200. If the pouch type secondary battery formed by the structure is received on a coupling part of the battery of portable electronic devices (not shown), the charge/discharge terminal 510 may be coupled to the coupling part of the battery of portable electronic devices so as to be orthogonal to a narrow side surface of the pouch 200.

Figure 9:
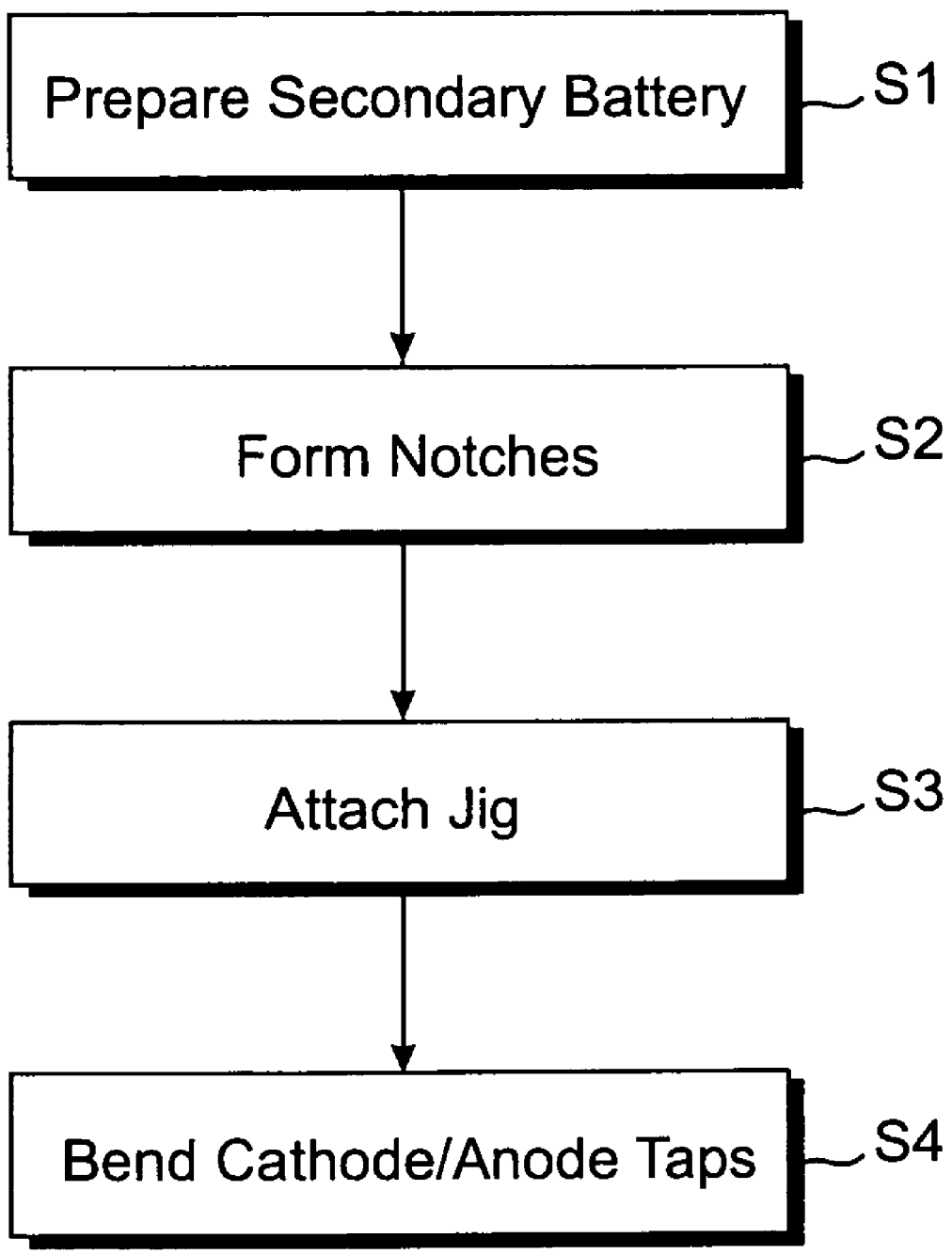
FIG. 9 is a flowchart of a fabrication method of the pouch type secondary battery according to one exemplary embodiment of the present invention.

Referring to FIG. 9, a method of fabrication of the pouch type secondary battery includes preparing a battery (S1), forming notches (S2), attaching a jig (S3) and bending the cathode tap 111 and the anode tap 121(S4).

Figure 10A:
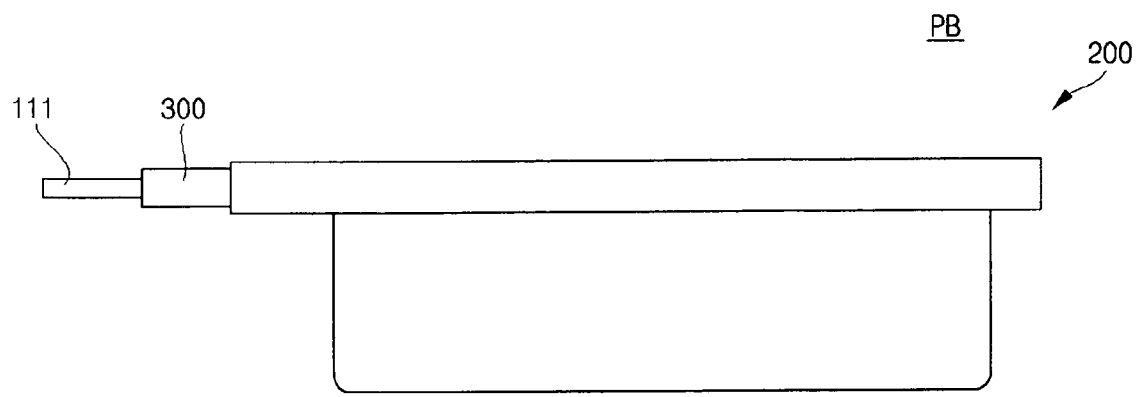
FIGS. 10a to 10e are side views of the pouch type secondary battery according to one exemplary embodiment of the present invention.

Referring to FIG. 10a, in step (S1), the pouch type secondary battery (PB) receives the electrode assembly (not shown) and exposes the cathode tap 111 and the anode tap 121 insulated by the cathode and anode insulating tapes 300 and 400.

Figure 10B:
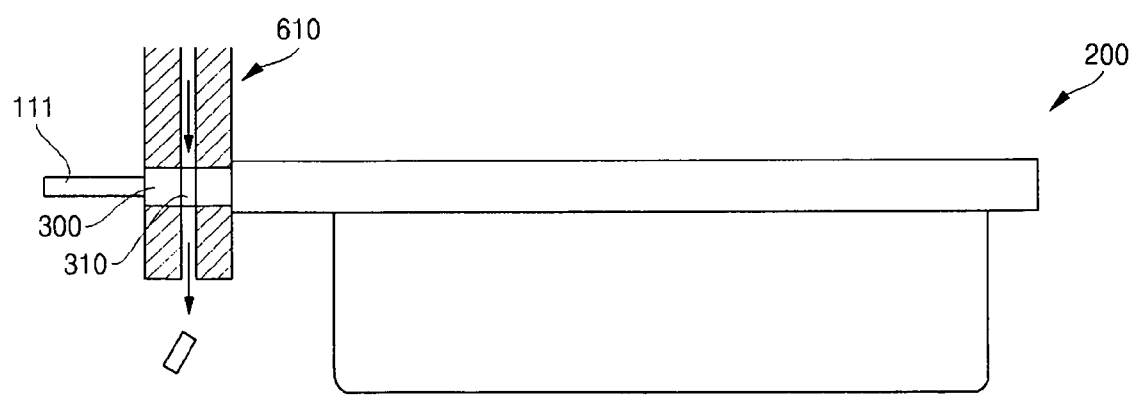

Referring to FIG. 10b, in step (S2), notches are formed on both side portions of the cathode insulating tape 300 and the anode (not shown). The notches may be formed by a perforator 610. The notches may be formed so as not to be close to the cathode tap 111 and the anode tap (not shown), so that insulation property of the cathode 300 and the anode (not shown) may be maintained.

Figure 10C:
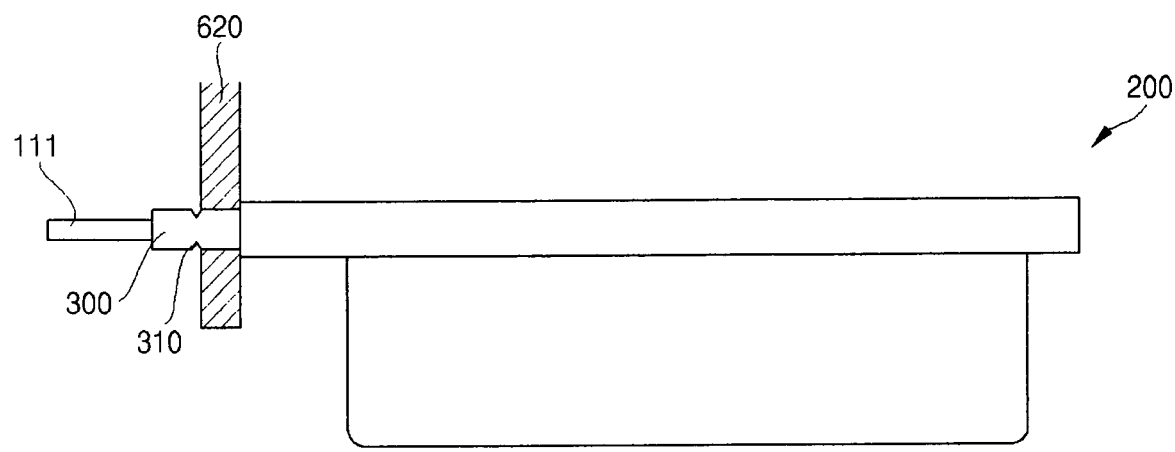
Figure 10D:
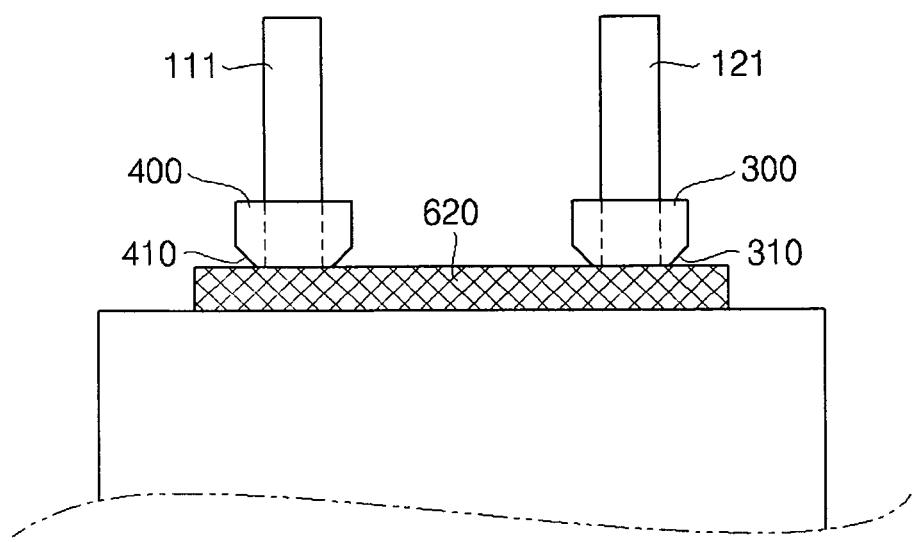

Referring to FIGS. 10c and 10d, in step (S3), a rectangular jig 620 may be attached on a straight line connecting the vertexes of the notches.

Figure 10E:
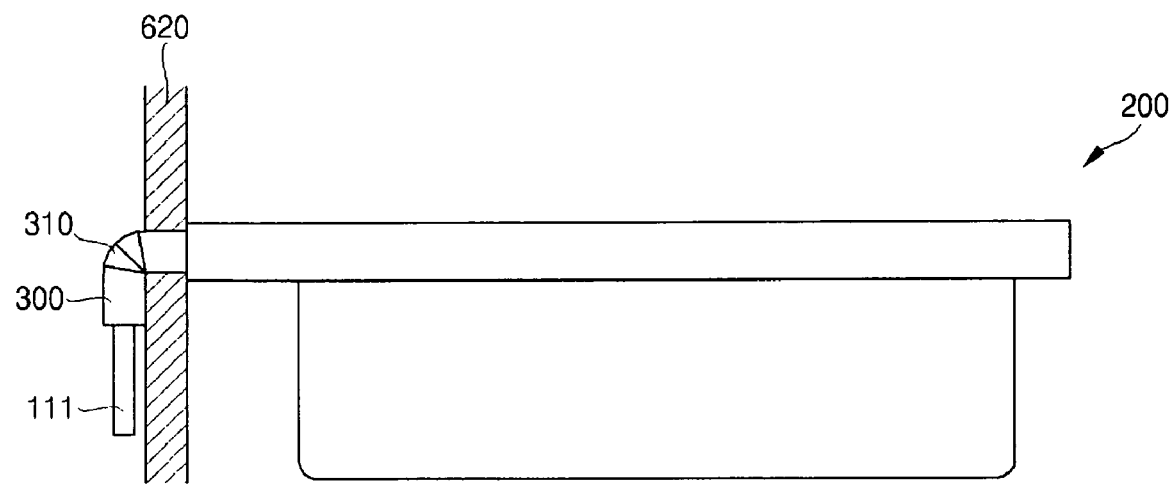

Referring to FIG. 10e, in step (S4), the cathode tap 111 and the anode tap (not shown) may be bent at the vertexes of the notches. A bent angle may be different, depending on a position of the protection circuit substrate (not shown) coupled to the cathode tap 111 and the anode tap (not shown).

As described above, the pouch type secondary battery according to the present invention produces the following effects.

First, the bent state of the cathode tap and the anode tap can be maintained by removing the restoration phenomenon caused by the elastic force of the insulating tape when the cathode tap and the anode tap are bent by forming bending grooves on the cathode and anode insulating tapes.

Second, the productivity can be improved because the cathode tap and the anode tap are always bent at a same position by the bending grooves.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as being limitations of the present invention.

What is claimed is:
1. A pouch type secondary battery, comprising:
an electrode assembly including a cathode electrode plate having a cathode tap connected thereto, an anode electrode plate having an anode tap connected thereto, and a separator interposed between the cathode electrode plate and the anode electrode plate;
a pouch containing the electrode assembly therein, the cathode tap and the anode tap extending outside of the pouch;

a cathode insulation tape including a first bending groove arranged on at least one side portion thereof and wrapped around the cathode tap to electrically insulate a region where the cathode tap contacts the pouch, said first bending groove is orthogonal to a longitudinal direction of the cathode tap; and an anode insulation tape including a second bending groove arranged on at least one side portion thereof and wrapped around the anode to electrically insulate a region where the anode tap contacts the pouch, said second bending groove is orthogonal to a longitudinal direction of the cathode tap.

2. The pouch type secondary battery of claim 1, wherein the cathode tap and the anode tap extend in a same direction from the pouch and are parallel to each other.

3. The pouch type secondary battery of claim 1, wherein the cathode and anode insulating tapes each comprise either polypropylene or polyethylene.

4. The pouch type secondary battery of claim 1, wherein the first and second bending grooves are arranged on the same line.

5. The pouch type secondary battery of claim 1, wherein the first bending groove is symmetrically arranged on both side portions of the cathode insulating tape, and the second bending groove is symmetrically arranged on both side portions of the anode insulating tape.

6. The pouch type secondary battery of claim 1, wherein the first and second bending grooves have equal depths.

7. The pouch type secondary battery of claim 1, wherein the first and second bending grooves have different depths.

8. The pouch type secondary battery of claim 1, wherein the first and second bending grooves each comprise a 'V' shaped notch.

9. The pouch type secondary battery of claim 8, wherein the first and second bending grooves are arranged in a direction such that one of two edges neighboring the pouch is orthogonal to a longitudinal direction of the respective cathode tap and anode tap.

10. The pouch type secondary battery of claim 1, wherein the first and second bending grooves each comprise a 'U' shaped notch.

11. The pouch type secondary battery of claim 1, wherein the cathode tap is bent at the first bending groove and the anode tap is bent at the second bending groove.

12. The pouch type secondary battery of claim 11, wherein one end portion of each of the cathode tap and the anode tap is electrically coupled to a protection circuit substrate having a charge/discharge terminal, and wherein the cathode tap and the anode tap are each bent more than once, so that a wide surface of the protection circuit substrate including the charge/discharge terminal is parallel to a wide surface of the pouch.

13. The pouch type secondary battery of claim 11, wherein one end portion of each of the cathode tap and the anode tap is electrically coupled to the protection circuit substrate having a charge/discharge terminal, and wherein the cathode tap and the anode tap are each bent, so that a wide surface of the protection circuit substrate including the charge/discharge terminal is orthogonal to a wide surface of the pouch.

14. The pouch type secondary battery of claim 12, further comprising an inspecting terminal arranged on the wide surface where the charge/discharge terminal of the protection circuit substrate is arranged.

15. The pouch type secondary battery of claim 13, further comprising an inspecting terminal arranged on the wide surface where the charge/discharge terminal of the protection circuit substrate is arranged.

16. A method of fabrication of a pouch type secondary battery, the method comprising:

arranging an electrode assembly within a pouch of the secondary battery and exposing a cathode tap and an anode tap respectively insulated by cathode and anode insulating tapes;

forming a notch on both side portions of each of the cathode and anode insulating tapes;

attaching a rectangular jig on a straight line connecting vertexes of the notches; and bending both the cathode tap and the anode tap at the vertexes of the notches, wherein said straight line is orthogonal to a longitudinal direction for each of the cathode and anode tap.

* * * * *